March 26, 1940.  B. A. DIGGINS  2,195,166
OBLIQUE LIGHT DIAPHRAGM
Filed June 30, 1938  2 Sheets-Sheet 2
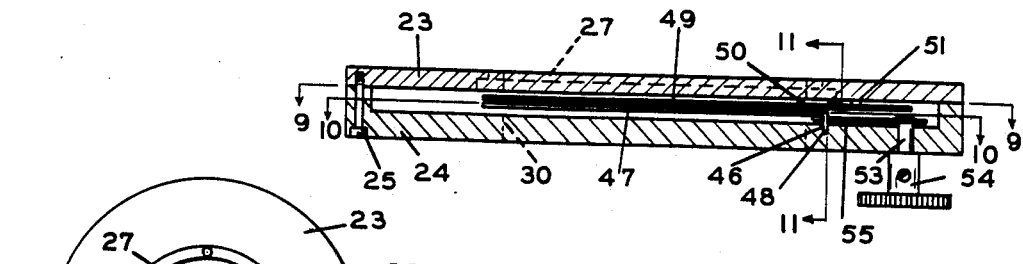
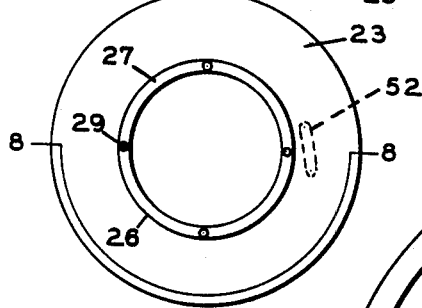
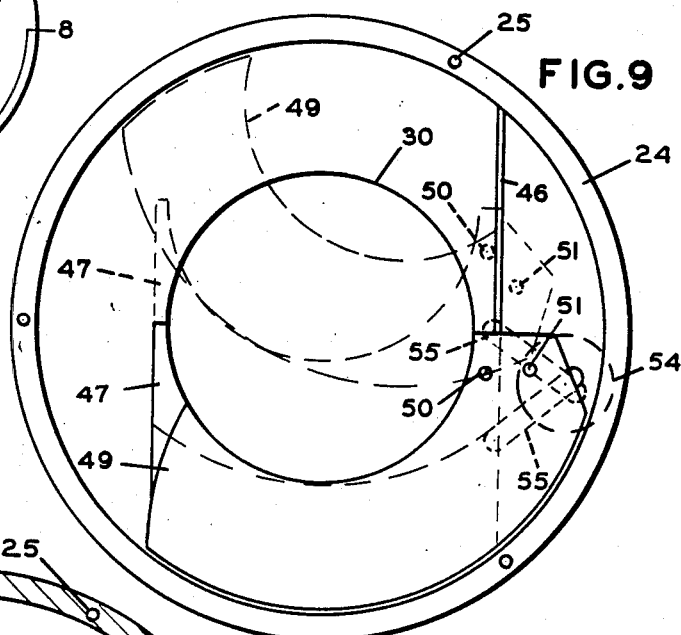
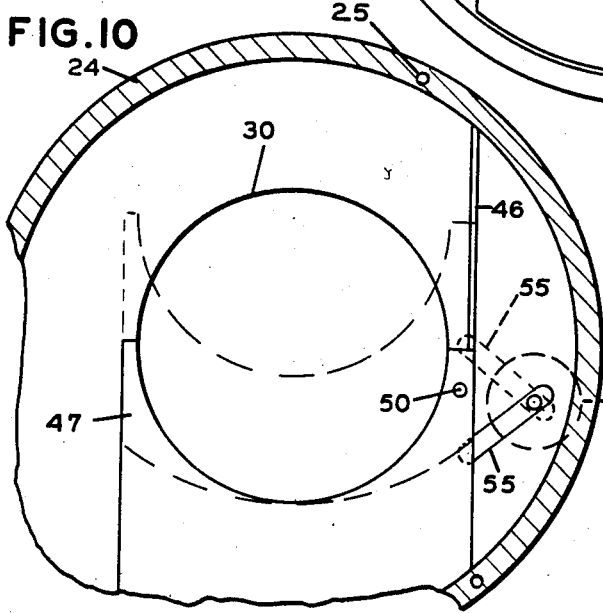
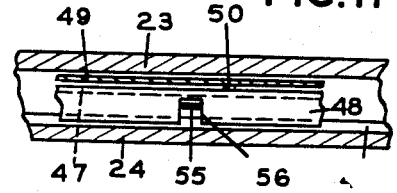
BARTHOLOMEW A. DIGGINS
INVENTOR
BY *G. A. Ellestad*
ATTORNEY Patented Mar. 26, 1940

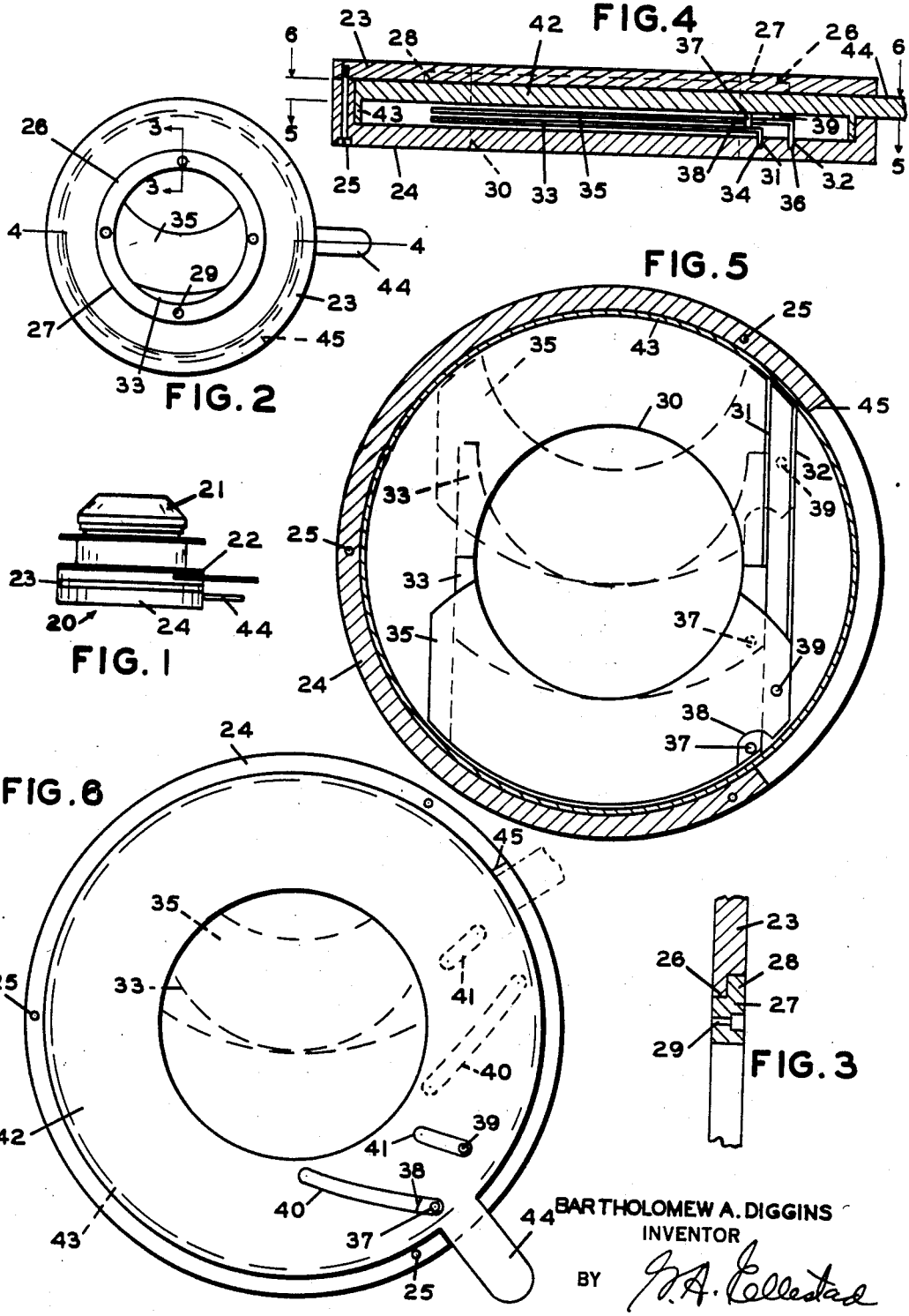

2,195,166

UNITED STATES PATENT OFFICE 2,195,166

OBLIQUE LIGHT DIAPHRAGM

Bartholomew A. Diggins, Irondequoit, N. Y., assignor to Bausch & Lomb Optical Company, Rochester, N. Y., a corporation of New York Application June 30, 1938, Serial No. 216,742

5 Claims. (Cl. 88—40)

The present invention relates to light diaphragms and more particularly to oblique light diaphragms for optical instruments such as microscopes.

One of the objects of the present invention is to provide an oblique light diaphragm which is simple and inexpensive to manufacture yet rugged and efficient in operation. Another object is to provide an oblique light diaphragm in which a plurality of unconnected leaves are simultaneously moved across a light beam at different rates. A further object is to provide such a diaphragm having independently slidable leaves and a cam for moving the leaves simultaneously. Still another object is to provide such a diaphragm in which one leaf is slidable and a second leaf is pivotally mounted on the first leaf. These and other objects and advantages reside in certain novel features of construction, arrangement and combination of parts as will hereinafter be more fully set forth and pointed out in the appended claims.

In the drawings:

Fig. 1 is a side elevation showing my diaphragm secured to a microscope condenser.

Fig. 2 is a top plan view of the diaphragm.

Fig. 3 is a section taken on line 3—3 of Fig. 2.

Fig. 4 is a section taken on line 4—4 of Fig. 2.

Fig. 5 is a section taken on line 5—5 of Fig. 4.

Fig. 6 is a section taken on line 6—6 of Fig. 4.

Fig. 7 is a top plan view of a modification.

Fig. 8 is a section taken on line 8—8 of Fig. 7.

Fig. 9 is a section taken on line 9—9 of Fig. 8.

Fig. 10 is a section taken on line 10—10 of Fig. 8.

Fig. 11 is a section taken on line 11—11 of Fig. 8.

The oblique light diaphragm indicated generally at 20 in Fig. 1, is preferably secured to a conventional microscope condenser 21 beneath the usual iris diaphragm 22. This oblique diaphragm consists of a top plate 23 and a cup-shaped base 24 suitably secured thereto as, for example, by bolts 25. The top plate 23 has a central opening 26 within which an annular disk 27 is rotatably mounted. A flange 28 on the disk 27 holds it in the opening 26. A plurality of holes 29 are formed in the disk 27 to receive screws or bolts for attachment to the iris diaphragm 22. Any other suitable means for rotatably securing the oblique diaphragm to the iris diaphragm could, of course, be used.

The bottom of the base 24 is provided with an aperture 30 in alignment with the aperture in the annular disk 27. Alongside of this aperture 30 are two straight, parallel bearing slots or grooves 31 and 32 which extend entirely across the bottom of the base. A shutter or diaphragm leaf 33 has a downwardly bent end or projection 34 which is slidable in the bearing slot or groove 31. A second, similar leaf 35 has a similar projection 36 which is slidable in the groove 32.

These two leaves 33 and 35 are of such size that in retracted or inoperative position, they are superposed out of the path of light through the apertures in the base and disk. The leaves can, however, be moved to the dotted positions shown in Figs. 5 and 6 in which they cover all but a small part of the aperture 30 and thus permit only a narrow oblique ray to pass.

The leaf 33 has an upstanding pin 37 which extends through a notch 38 in the leaf 35. A similar pin 39 is fixed to the leaf 35. These two pins 37 and 39 project, respectively, into cam slots 40 and 41 in a cam 42. This cam 42 is annular in form and is provided with a flange 43 which rotatably engages the inner wall of the cup-shaped base 24. A handle 44 fixed to the cam 42, extends through a slot 45 in the wall of the base 24 to provide a convenient and accessible actuating means.

The two cam slots 40 and 41 are so formed that the two leaves 33 and 35 will be moved simultaneously at different rates transversely of the aperture 30. The cam slot 41 is formed in a manner known in the art so that a movement of the cam 42 through 90 degrees will cause the leaf 35 to move from the full line position to the dotted line position as shown in Fig. 5. The cam slot 40 causes the shorter movement of the leaf 33 between the full and dotted positions of Fig. 5 upon the same angular movement of the cam 42. The movement of the cam slots 40 and 41 between these two positions is indicated by the full and dotted lines in Fig. 6.

In the modification shown in Figs. 7 to 11, the base 24 has only one bearing groove 46 and a leaf 47 is provided with the bent edge 48 which is slidable in this groove 46. A second leaf 49 is pivotally secured on the leaf 47 by a pivot pin 50. Spaced from this pivot pin 50, the leaf 49 has an upstanding projection 51 which engages in a cam slot 52 in the top plate 23. This cam slot 52 is so formed that as the leaf 47 is slid along the bearing groove 46, the leaf 49 is made to turn on the pivot pin 50. In inoperative position, the two leaves 47 and 49 are superposed out of the path of light as shown in full lines in Fig. 9. When the leaf 47 is moved to the dotted position shown in Figs. 9 and 10, the leaf 49 is rocked on its pivot 50 so that it assumes the dotted position shown in Fig. 9.

Any suitable means can be provided for moving the leaf 47. The mechanism illustrated is merely one simple and inexpensive way of accomplishing this purpose. A short stub shaft 53 is rotatably journalled in the base 24 and is provided outside with a knurled head 54 for convenient rotation. An arm 55 is fixed on the end of the shaft 53 within the base 24 and projects into a notch 56 in the bent edge 48 of the leaf 47. Upon turning the shaft 53 by the head 54, the arm 55 engages against one side or the other of the notch 56 to move the leaf 47. Obviously, equivalent mechanisms such as a rack and pinion, or crank arm could be used.

The other details of construction of the modification shown in Figs. 7 to 11 are substantially the same as in Figs. 1 to 6.

From the foregoing, it will be apparent that I am able to attain the objects of my invention and provide an efficient but inexpensive oblique light diaphragm in which shutter or diaphragm leaves are simultaneously moved across the light beam at different rates of speed. Various modifications can, of course, be made without departing from the spirit of my invention or the scope of the appended claims.

I claim:

1. An oblique light diaphragm for use on optical instruments comprising a base having an opening therein, a plurality of independent leaves slidably mounted on said base, a plate rotatably mounted on said base, cam slots in said plate, one for each leaf, and means on each leaf engaging in a cam slot, said cam slots being so formed that rotation of said plate moves said leaves simultaneously across said opening, each leaf at a different rate.

2. An oblique light diaphragm for use on optical instruments including a base having an aperture therein, a shutter leaf slidably mounted on said base for movement across said aperture, a second leaf pivotally mounted on said shutter leaf, a projection on said second leaf, a cam fixedly secured to said base for engaging said projection to cause the second leaf to turn in the direction of movement of said shutter leaf, and means for sliding said shutter leaf.

3. An oblique light diaphragm for use on optical instruments, including a base plate having an aperture therein, a shutter leaf slidably mounted on said base plate for movement across said aperture, a second leaf pivotally mounted on said shutter leaf, means for sliding said shutter leaf and cam means engaging said second leaf upon movement of said shutter leaf to cause said shutter leaf to pivot across said aperture, said leaves being adapted to be positioned at different distances across said aperture.

4. An oblique light diaphragm for optical instruments comprising a base having a central light opening therein, a plurality of overlapping shutter leaves movably carried by said base, said shutter leaves having an inoperative position at one side of said light opening and means carried by said base and operatively connected to said leaves for simultaneously moving said leaves at different rates from said one side partially across said opening toward the other side, the slower moving leaf covering the space between the faster moving leaf and said one side of the opening.

5. An oblique light diaphragm for optical instruments comprising a base having an aperture therethrough, a plurality of unconnected shutter leaves movably mounted on said base, said leaves having an inoperative position at one side of said aperture, actuating means carried by said base and operatively connected to one leaf for moving said one leaf transversely partially across said aperture from said one side toward the other side, actuating means carried by said base and operatively connected to another leaf for simultaneously moving said other leaf transversely partially across said aperture to a position overlaping the trailing edge of the first leaf and said one side of the aperture and means for simultaneously operating both of said actuating means.

BARTHOLOMEW A. DIGGINS.